US009194412B2

(12) United States Patent
Haines, Jr.

(10) Patent No.: US 9,194,412 B2
(45) Date of Patent: Nov. 24, 2015

(54) LOCK BOLT COLLAR WITH HIGH STANDOFF INTERNAL BEAD

(71) Applicant: Alcoa Inc., Pittsburgh, PA (US)

(72) Inventor: Donald William Haines, Jr., Woodway, TX (US)

(73) Assignee: Alcoa Inc., Pittsburgh, PA (US)

( * ) Notice: Subject to any disclaimer, the term of this patent is extended or adjusted under 35 U.S.C. 154(b) by 32 days.

(21) Appl. No.: 14/230,429

(22) Filed: Mar. 31, 2014

(65) Prior Publication Data

US 2015/0078859 A1 Mar. 19, 2015

Related U.S. Application Data

(60) Provisional application No. 61/879,854, filed on Sep. 19, 2013.

(51) Int. Cl.
*F16B 19/00* (2006.01)
*F16B 19/05* (2006.01)

(52) U.S. Cl.
CPC ..................................... *F16B 19/05* (2013.01)

(58) Field of Classification Search
CPC ........... F16B 19/05; F16B 21/16; F16B 19/00
USPC .............. 411/338, 361, 366.1, 383, 432, 918, 411/929
See application file for complete search history.

(56) References Cited

U.S. PATENT DOCUMENTS 2,531,049 A 3/1949 Huck
2,531,048 A 11/1950 Huck
2,764,045 A 1/1953 Koenig
3,029,665 A 4/1962 Baugh et al.
3,215,024 A 11/1965 Brilmyer et al.
3,915,053 A 10/1975 Ruhl
4,299,519 A 11/1981 Corbett
4,447,077 A 5/1984 Palmer
4,472,096 A 9/1984 Ruhl et al.
4,531,871 A 7/1985 Sigmund
4,597,263 A 7/1986 Corbett
4,813,834 A 3/1989 Smith
4,867,625 A 9/1989 Dixon
4,878,372 A 11/1989 Port et al.

(Continued)

FOREIGN PATENT DOCUMENTS

EP 1 903 221 A2 3/2008
WO 2012/129390 A1 9/2012

OTHER PUBLICATIONS

International Search Search Report and Written Opinion issued by the European Patent Office on Jul. 18, 2014 in counterpart International (PCT) Application No. PCT/US2014/032337 filed on Mar. 31, 2014.

*Primary Examiner* — Roberta Delisle
(74) *Attorney, Agent, or Firm* — Greenberg Traurig, LLP

(57) ABSTRACT

A lock bolt collar comprises a shank having a first end, a second end opposite the first end, a through-bore extending from the first end to the second end, an inner wall having an internal bead located proximate to the first end of the shank and extending circumferentially and inwardly into the through-bore. The bead includes a first inner diameter and an extended portion extending from the bead and to a point proximate to the second end, the extended portion including a second inner diameter, where the second inner diameter is greater than the first inner diameter.

14 Claims, 3 Drawing Sheets

(56) References Cited

U.S. PATENT DOCUMENTS 4,921,384 A 5/1990 Nordyke
4,943,196 A 7/1990 Dahl
5,049,016 A 9/1991 Nordyke
5,090,852 A 2/1992 Dixon
5,125,778 A 6/1992 Sadri
5,315,755 A 5/1994 Fulbright et al.
5,548,889 A 8/1996 Smith et al.
5,604,968 A 2/1997 Fulbright et al.
6,233,802 B1 5/2001 Fulbright
6,235,582 B1 5/2001 Chen
6,325,582 B1 12/2001 Sadri et al.
6,497,024 B2 12/2002 Fulbright
6,702,684 B2 3/2004 Harbin et al.
7,195,438 B2 3/2007 Harbin et al.
7,293,339 B2 11/2007 Mercer et al.
7,695,226 B2 * 4/2010 March et al. .................... 411/43
8,465,240 B2 * 6/2013 Corbett et al. ............. 411/366.1
8,475,102 B2 * 7/2013 Haylock et al. ............... 411/361
8,573,910 B2 * 11/2013 March et al. .................... 411/43
8,727,685 B2 * 5/2014 Corbett ......................... 411/361
2008/0247841 A1 10/2008 Mercer et al.
2010/0172717 A1 * 7/2010 Corbett et al. ............. 411/366.1
2013/0202382 A1 * 8/2013 Corbett ......................... 411/361

* cited by examiner

LOCK BOLT COLLAR WITH HIGH STANDOFF INTERNAL BEAD

CROSS-REFERENCE TO RELATED APPLICATION

This application is a Section 111(a) application relating to and claiming the benefit of commonly owned, U.S. Provisional Patent Application Ser. No. 61/879,854 entitled "LOCK BOLT COLLAR WITH HIGH STANDOFF INTERNAL BEAD," filed Sep. 19, 2013, the entirety of which is incorporated herein by reference.

FIELD OF THE INVENTION

The present invention relates to fasteners and, more particularly, a fastener including a lock bolt collar having a high standoff internal bead.

BACKGROUND OF THE INVENTION

Two-piece swaged fasteners, commonly referred to as lock bolts, are used to secure a plurality of work pieces together. Typically, swage-type fasteners include a pin member having lock grooves and a lock bolt collar adapted to be swaged into the lock grooves of the pin member by a fastener installation tool. The amount of gap pull out or force exerted on the work pieces is a direct function of the force needed to initiate swaging of the collar. In some applications, such as the removal of a stiff gap in heavy work pieces, it is desirable that the resistance of the collar to being swaged be as high as possible.

SUMMARY OF THE INVENTION

In an embodiment, a lock bolt collar comprises a shank having a first end, a second end opposite the first end, a through-bore extending from the first end to the second end, an inner wall having an internal bead located proximate to the first end of the shank and extending circumferentially and inwardly into the through-bore, the bead including a first inner diameter, and an extended portion extending from the bead and to a point proximate to the second end, the extended portion including a second inner diameter, wherein the second inner diameter is greater than the first inner diameter. In an embodiment, the shank includes an exterior surface having an outer diameter that is substantially constant from the first end to the second end. In an embodiment, a flange is located at the first end of the shank. In an embodiment, the shank includes a tapered portion located at the second end thereof, wherein the tapered portion includes an inner taper portion and an outer taper portion. In an embodiment, each of the inner and outer taper portions taper at an angle in a range of about 15 degrees to about 30 degrees relative to a longitudinal axis of the collar. In an embodiment, the shank includes a radiused portion located at the second end thereof. In an embodiment, the lock bolt collar further comprises at least one material selected from the group consisting of low carbon steel, annealed low carbon steel, unannealed low carbon steel, medium carbon boron steel, and medium carbon steel. In an embodiment, the lock bolt collar is as-headed.

In an embodiment, a fastener comprises a pin member having an elongated shank portion which terminates at one end in a head and includes a threaded portion having a plurality of threads with lock grooves; and a lock bolt collar including a shank having a first end, a second end opposite the first end, a through-bore extending from the first end to the second end, an inner wall having an internal bead located proximate to the first end of the shank and extending circumferentially and inwardly into the through-bore, the bead including an inner surface having a first inner diameter, and an extended portion extending from the bead and to a point proximate to the second end, the extended portion including a second inner diameter, wherein the second inner diameter is greater than the first inner diameter.

DETAILED DESCRIPTION OF THE DRAWINGS

The term "clamp load" as used herein is the amount of load applied to joined (i.e., bolted) work pieces to keep them together and avoid relative motion between the work pieces.

The term "snub load" as used herein means the load at which a collar first engages lock grooves of a pin member.

The term "stand-off" as used herein is the load that resists or holds off the initial swage of a collar until a desired preload value is attained.

Figure 1:
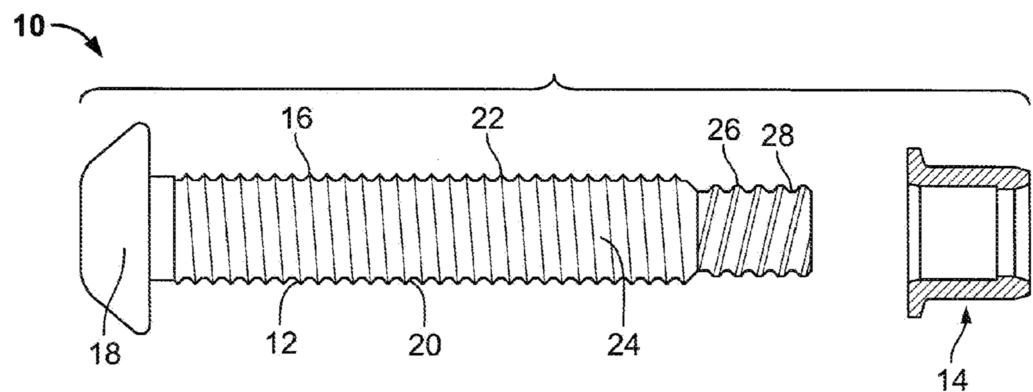
FIG. 1 is an exploded, side elevational view of a fastener constructed in accordance with an embodiment of the present invention.

Referring to FIG. 1, in an embodiment, a fastener 10 includes a pin member 12 and a lock bolt collar 14 that is sized and shaped to mate with and be swaged onto the pin member 12. In an embodiment, the pin member 12 includes an elongated shank portion 16 which terminates at one end in a head 18. In an embodiment, the shank portion 16 includes a threaded portion 20 having a plurality of threads 22 with lock grooves 24, and a pull portion 26 having a plurality of pull grooves 28. In an embodiment, the pin member 12 is made from medium carbon alloy steel. In an embodiment, the pin member 12 is a Grade 9 (Class 12.9) strength level bolt. In other embodiments, the pin member 12 can be characterized by any grade known in the art, such as, for example, Grade 2, Grade 5, Grade 8, Class 8.8, and Class 10.9. In other embodiments, the pin member 12 may be made from other suitable materials known in the art. In other embodiments, the pin member 12 can consist of any of the pin members as disclosed and described in U.S. Pat. No. 7,293,339 to Mercer et al., which is incorporated by reference herein in its entirety.

Figure 2:
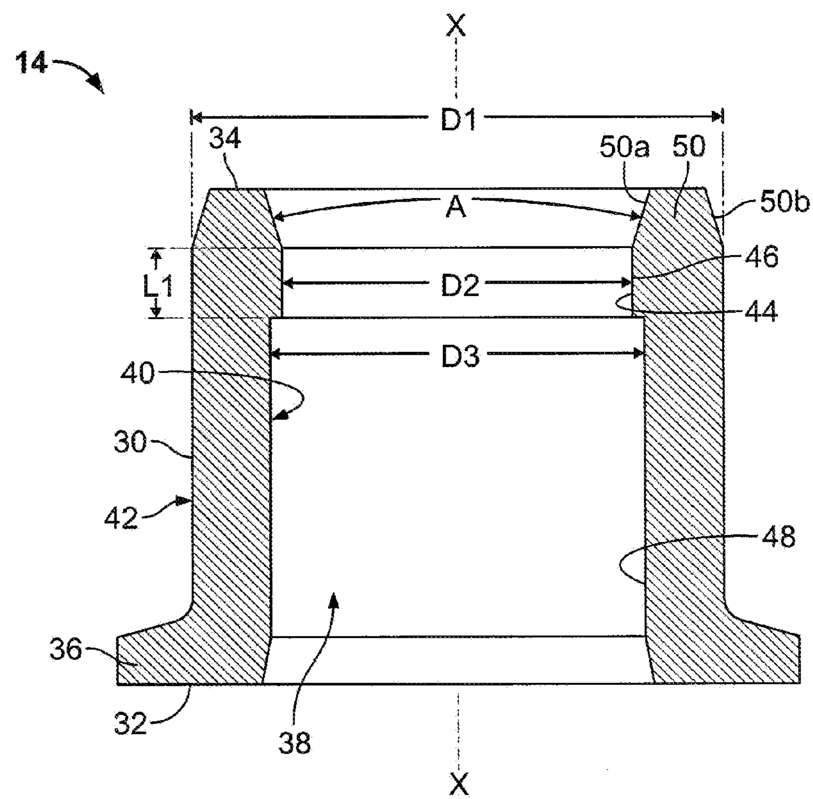
FIG. 2 is a side elevational view of an embodiment of a lock bolt collar employed by the fastener shown in FIG. 1.

Referring to FIG. 2, the lock bolt collar 14 includes a tubular-shaped shank 30 having a first end 32 and a second end 34 opposite the first end 32, a flange 36 extending circumferentially from and at the first end 32 and a through-bore 38 extending from the first end 32 to the second end 34, which forms an interior portion and an inner wall 40 of the collar 14. In an embodiment, an exterior surface 42 of the shank 30 includes a generally uniform, cylindrical configuration and includes an outer diameter D1. In an embodiment, the inner wall 40 of the lock bolt collar 14 includes an internal bead 44 extending circumferentially and inwardly into the through bore 38. In an embodiment, the bead 44 includes an inner surface 46 having an inner diameter D2. In an embodiment, the bead 44 is located proximate to the first end 34. In an embodiment, the axial length L1 of the bead 44 is about 0.230 inch for a ⅝" collar. In an embodiment, the inner wall 40 of the lock bolt collar 14 includes an extended portion 48, which extends longitudinally from the bead 44 and to a point proximate to the second end 36. In an embodiment, the extended portion 48 includes an inner diameter D3. In an embodiment, the inner diameter D3 is greater than the inner diameter D2. In an embodiment, the lock bolt collar 14 includes a tapered portion 50 located proximate to the first end 34. In an embodiment, the tapered portion 50 includes inner and outer tapers 50*a*, 50*b*, each of which tapers at an angle A measured relative to the longitudinal axis X-X of the lock bolt collar 14. The tapers 50*a*, 50*b* help resist initial lock-up of the lock bolt collar 14 during installation. In an embodiment, in an undeformed state, the angle A is about 30 degrees from longitudinal axis X-X of the lock bolt collar 14. In an embodiment, in an undeformed state, the angle A is about 15 degrees from longitudinal axis X-X of the lock bolt collar 14. In another embodiment, the lock bolt collar 14 need not include the tapered portion 50. In another embodiment, the lock bolt collar 14 includes a radiused portion in place of the tapered portion 50 (not shown in the Figures).

In an embodiment, the lock bolt collar 14 includes an internal fit-up tab extending from the second inner wall 48 (not shown in the Figures). In an embodiment, the fit-up tab includes a single thread, such as that shown in U.S. Pat. No. 4,867,625 to Dixon, which is incorporated by reference herein in its entirety. In an embodiment, the fit-up tab is positioned proximate to the first end 32 of the shank 30 of the lock bolt collar 14. In another embodiment, the fit-up tab is positioned proximate to the second end 34 of the shank 30 of the swage collar 14. In another embodiment, the lock bolt collar 14 need not include the fit-up tab.

In an embodiment, the lock bolt collar 14 is made of low carbon steel. In another embodiment, the lock bolt collar 14 is made from unannealed low carbon steel. In another embodiment, the lock bolt collar 14 is made from annealed low carbon steel. In another embodiment, the lock bolt collar 14 is made from medium carbon boron steel, such as, for example, 10B22 steel. In another embodiment, the lock bolt collar 14 is made from medium carbon steel, such as, for example, 1038 steel. In another embodiment, the lock bolt collar 14 is "as-headed" and does not require thermal processing, as disclosed and described in aforesaid U.S. Pat. No. 7,293,339 to Mercer et al. As employed herein, the term "as-headed" refers to a collar which is strain hardened, for example, from cold working, rather than changing hardness using a thermal process (e.g., quench and tempering; stress relieving; etc.).

Figure 3:
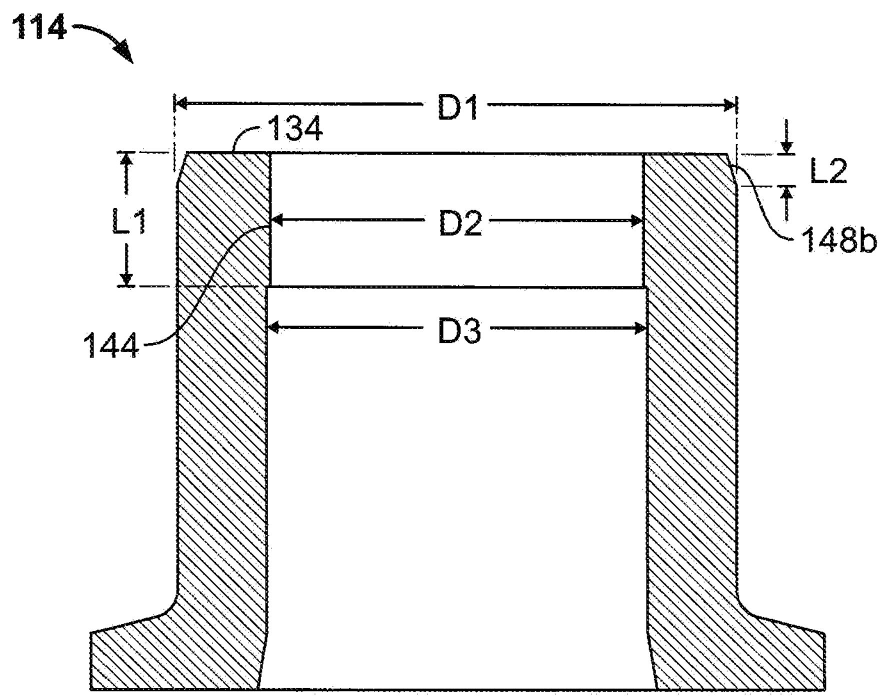
FIG. 3 is a side elevational view of another embodiment of a lock bolt collar.

FIG. 3 shows another embodiment of a lock bolt collar 114 having a bead 144. The lock bolt collar 114 is similar in structure and function to the lock bolt collar 14, except that the lock bolt collar 114 does not include an inner tapered portion, and the bead 144 extends to a second end 134 of the collar 114. In an embodiment, the bead 144 has an axial length L1 of 0.230 inch for a ⅝" collar. In an embodiment, the lock bolt collar 114 includes an outer tapered portion 148*b* having an axial length L2.

Figure 4:
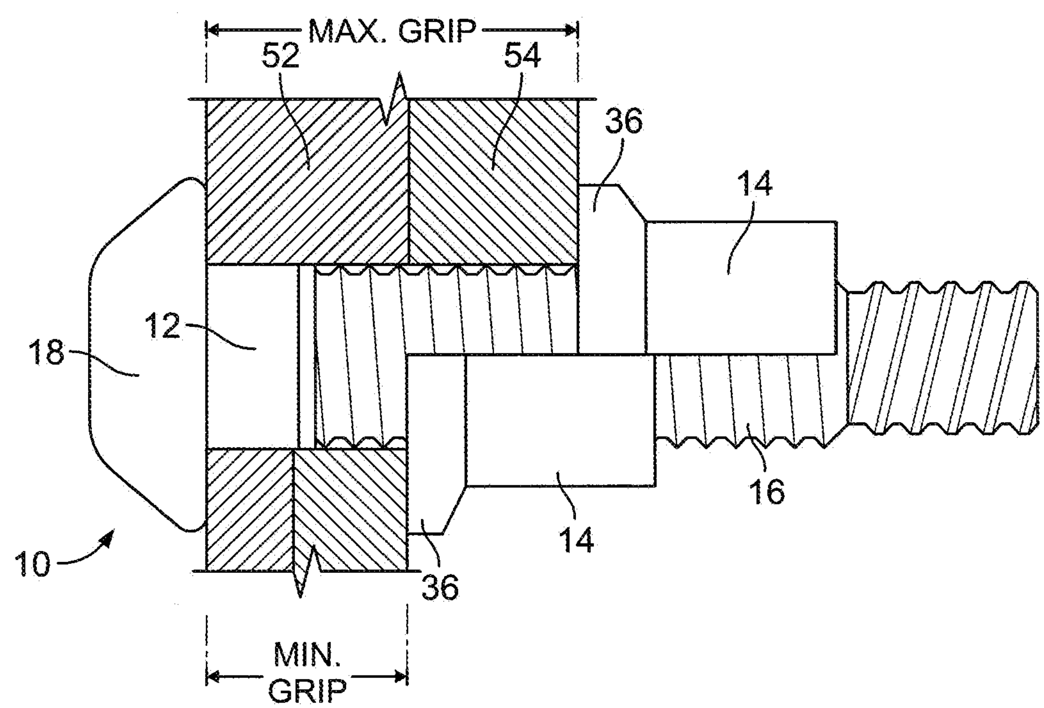
FIG. 4 is a side, partial cross-sectional view of the fastener in an installed position, a portion of a collar being shown in a minimum grip position, and a portion of another similar collar shown in a maximum grip position for the purposes of comparison.

Referring to FIG. 4, in an embodiment, the lock bolt collar 14 and the pin member 12 are adapted to secure a plurality of work pieces 52, 54 together. In an embodiment, the shank portion 16 of the pin member 12 is inserted through holes of the work pieces 52, 54, with the head 18 abutting one side of the work piece 52 and the shank portion 16 extending outwardly from one side of the work piece 54. In an embodiment, the lock bolt collar 14 is fitted on the shank portion 16 of the pin member 12, whereby the shank portion 16 is inserted within the through bore 38 of the collar 14. In an embodiment, the lock bolt collar 14 is fitted on the pin member 12 until the flange 36 of the collar 14 abuts the side of the work piece 54.

In an embodiment, the pull grooves 28 of the pin member 12 are adapted to be gripped by matching teeth of chuck jaws of a fastener installation tool having a swage anvil (not shown in the Figures). In an embodiment, the fastener installation tool may consist of the tools disclosed and described in aforesaid U.S. Pat. No. 7,293,339 to Mercer et al. In an embodiment, the swage anvil of the tool is adapted to engage the lock bolt collar 14 and apply a relative axial force between the collar 14 and the pin member 12, and to move over the collar 14 and swage it into the lock grooves 24 of the pin member 12 (not shown in the Figures).

Figure 5:
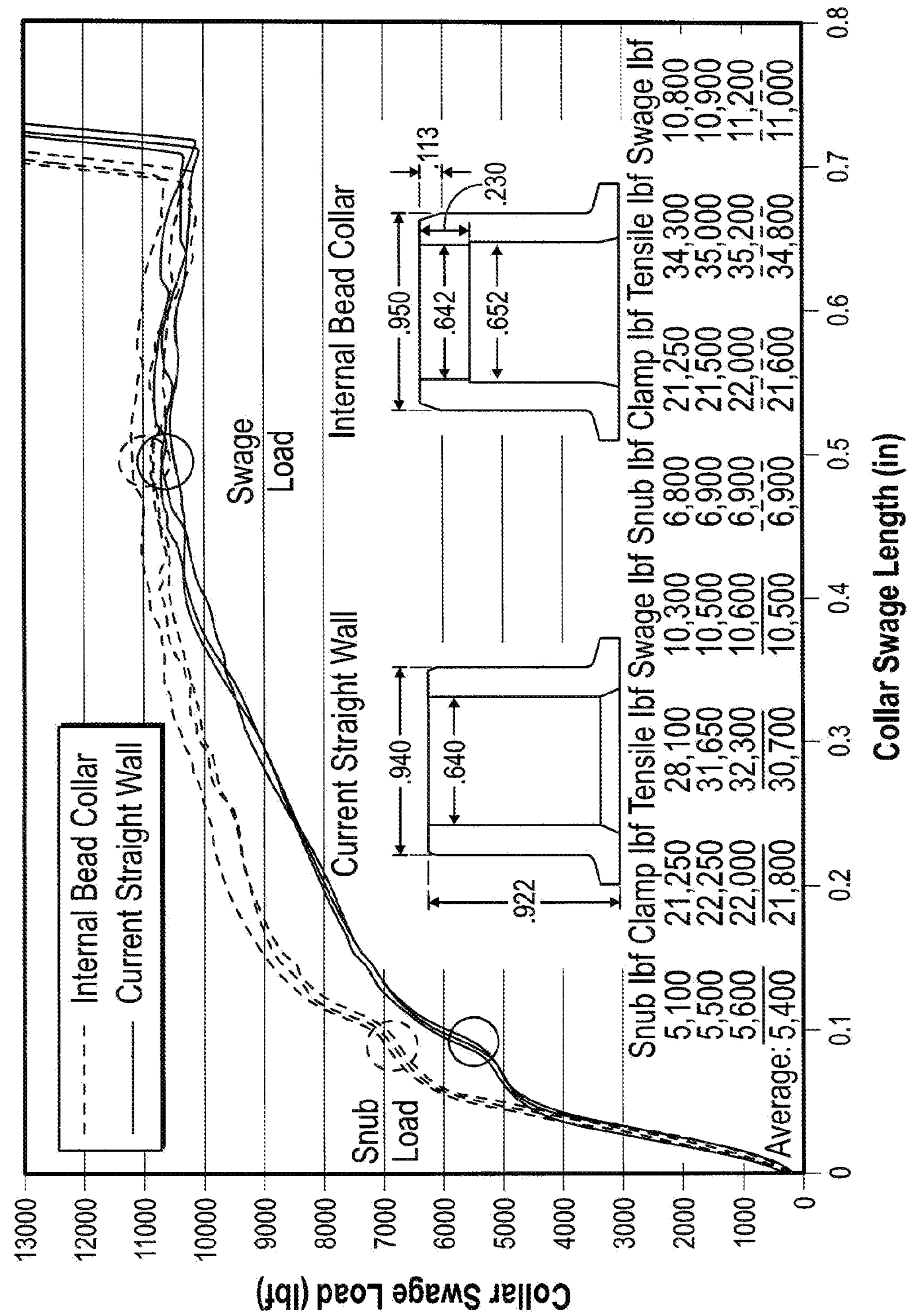
FIG. 5 is a graph showing a comparison of a standard straight wall collar and the collar of the present invention as a function of collar swage load versus collar swage length.

In an embodiment, during the installation process, the bead 44 of the lock bolt collar 14 provides for a high standoff to resist the initiation of the swaging process and, as a result of the larger inner diameter D3 of the extended portion 48, a substantially constant swage load during the swaging process. In an embodiment, the term "high standoff" means a stand-off that is in a range of about 30% to about 50% of final clamp load. In an embodiment, the final clamp load is about 19,200 lbs. while the standoff is about 7,000 lbs. for a Grade 5, ⅝ inch collar. The high stand-off allows for a lower maximum swage load while pulling out more gap and developing a higher final clamp load. As shown in FIG. 5, the swage curve is substantially horizontal during the swaging process, and the snub load of the collar 14 is increased as compared to a current straight-walled collar. In an embodiment, the collar 14 is also characterized by having approximately 3 to 4 times the gap pull-out force of typical collars.

It should be understood that the embodiments described herein are merely exemplary and that a person skilled in the art may make many variations and modifications without departing from the spirit and scope of the invention. All such variations and modifications are intended to be included within the scope of the invention.

What is claimed is:

1. A lock bolt collar, comprising a shank having a first end, a second end opposite the first end, a tapered portion located at the second end, a through-bore extending from the first end to the second end, an inner wall having an internal bead located proximate to the first end of the shank and extending circumferentially and inwardly into the through-bore, the bead including a first inner diameter, and an extended portion extending from the bead and to a point proximate to the second end, the extended portion including a second inner diameter, wherein the second inner diameter is greater than the first inner diameter, and the tapered portion including an inner taper portion and an outer taper portion.

2. The lock bolt collar of claim 1, wherein the shank includes an exterior surface having an outer diameter that is substantially constant from the first end to the second end.

3. The lock bolt collar of claim 1, further comprising a flange is located at the first end of the shank.

4. The lock bolt collar of claim 1, wherein each of the inner and outer taper portions taper at an angle in a range of about 15 degrees to about 30 degrees relative to a longitudinal axis of the collar.

5. The lock bolt collar of claim 1, wherein the shank includes a radiused portion located at the second end thereof.

6. The lock bolt collar of claim 1, wherein the lock bolt collar further comprises at least one material selected from the group consisting of low carbon steel, annealed low carbon steel, unannealed low carbon steel, medium carbon boron steel, and medium carbon steel.

7. The lock bolt collar of claim 6, wherein the lock bolt collar is as-headed.

8. A fastener, comprising:

a pin member having an elongated shank portion which terminates at one end in a head and includes a threaded portion having a plurality of threads with lock grooves; and a collar including a shank having a first end, a second end opposite the first end, a tapered portion located at the second end, a through-bore extending from the first end to the second end, an inner wall having an internal bead located proximate to the first end of the shank and extending circumferentially and inwardly into the through-bore, the bead including an inner surface having a first inner diameter, and an extended portion extending from the bead and to a point proximate to the second end, the extended portion including a second inner diameter, wherein the second inner diameter is greater than the first inner diameter, and the tapered portion including an inner taper portion and an outer taper portion.

9. The fastener of claim 8, wherein the shank of the collar includes an exterior surface having an outer diameter that is substantially constant from the first end to the second end.

10. The fastener of claim 8, wherein the collar includes a flange located at the first end of the shank.

11. The fastener of claim 8, wherein each of the inner and outer taper portions of the collar taper at an angle in a range of about 15 degrees to about 30 degrees relative to a longitudinal axis of the collar.

12. The fastener of claim 8, wherein the shank of the collar includes a radiused portion located at the second end thereof.

13. The fastener of claim 8, wherein the collar further comprises at least one material selected from the group consisting of low carbon steel, annealed low carbon steel, and unannealed low carbon steel.

14. The fastener of claim 13, wherein collar is as-headed.

* * * * *